United States Patent [19]
Paul et al.

[11] Patent Number: 5,987,710
[45] Date of Patent: Nov. 23, 1999

[54] ROPE SECUREMENT CLIP FOR FORMING A BREAK-AWAY CONNECTION

[76] Inventors: Dan Paul, 797 Greenville Rd., Mason; Nelson Jones, P.O.B. 481, Weare, both of N.H. 03281

[21] Appl. No.: 09/090,630

[22] Filed: Jun. 4, 1998

Related U.S. Application Data

[60] Provisional application No. 60/048,567, Jun. 4, 1997.
[51] Int. Cl.$^6$ .................................................. F16G 11/00
[52] U.S. Cl. ................................................ 24/130; 43/100
[58] Field of Search .................................. 43/43.1, 43.12, 43/100, 44.87, 44.9, 44.91; 24/130, 129 R, 129 A, 115 H; 403/391, 399, 397

[56] References Cited

U.S. PATENT DOCUMENTS

| D. 23,448 | 7/1894 | Evans | 24/129 R |
|---|---|---|---|
| 88,373 | 3/1869 | D'Heureuse | 24/130 |
| 102,605 | 5/1870 | Slaight et al. | 24/129 R |
| 317,350 | 5/1885 | Hasskarl | 24/129 R |
| 322,501 | 7/1885 | Taylor | 24/130 |
| 446,020 | 2/1891 | Seelbach | 24/129 R |
| 447,618 | 3/1891 | Miller | 24/129 R |
| 468,819 | 2/1892 | McAnarney | 24/130 |
| 518,880 | 4/1894 | Evans | 24/129 R |
| 555,340 | 2/1896 | Schwarzman | 24/130 |
| 555,770 | 3/1896 | Hisley | 24/129 R |
| 556,485 | 3/1896 | Wilson | 24/129 R |
| 585,564 | 6/1897 | Freeman | 24/129 R |
| 653,661 | 7/1900 | Conger | 24/129 R |
| 656,431 | 8/1900 | Stewart | 24/130 |
| 796,143 | 8/1905 | Nord | 24/129 R |
| 959,076 | 5/1910 | Scanlon | 24/129 R |
| 986,014 | 3/1911 | Krenzke | 24/130 |
| 1,047,654 | 12/1912 | Klersy | 24/129 R |
| 1,205,496 | 11/1916 | Whitehead | 24/129 R |
| 1,235,466 | 7/1917 | Harrison | 403/391 |
| 1,361,249 | 12/1920 | Giffin | 24/129 A |
| 1,391,457 | 9/1921 | Buckley et al. | 43/87 |
| 1,441,737 | 1/1923 | Mickelson | 24/129 R |
| 1,463,456 | 7/1923 | Bear | 24/129 R |
| 1,565,041 | 12/1925 | Arney | 24/129 R |
| 2,151,609 | 3/1939 | Menderman | 24/129 R |
| 2,359,588 | 10/1944 | Shea | 43/43.12 |
| 2,439,141 | 4/1948 | Meighan | 24/129 R |
| 2,459,287 | 1/1949 | Robbins et al. | 24/129 R |
| 2,523,785 | 9/1950 | Sereno | 403/391 |
| 2,884,478 | 4/1959 | Becker et al. | 403/391 |
| 3,002,780 | 10/1961 | Eggeman | 24/129 R |
| 3,309,745 | 3/1967 | Gintz et al. | 24/129 R |
| 3,353,232 | 11/1967 | Brownson | 24/129 R |
| 3,399,433 | 9/1968 | Faulkner | 403/391 |
| 3,426,472 | 2/1969 | Richard | 43/100 |
| 3,466,712 | 9/1969 | Behney | 403/391 |
| 3,540,083 | 11/1970 | O'connor | 403/391 |
| 3,641,700 | 2/1972 | Harrison | 43/43.12 |
| 4,445,295 | 5/1984 | Litrico | 43/100 |
| 4,528,771 | 7/1985 | Rea, Jr. | 43/44.9 |
| 5,239,770 | 8/1993 | Kohus | 43/44.91 |

(List continued on next page.)

FOREIGN PATENT DOCUMENTS 2046826  11/1980  United Kingdom ..................... 24/130

Primary Examiner—Michael J. Carone
Assistant Examiner—Darren W. Ark
Attorney, Agent, or Firm—Howson and Howson

[57] ABSTRACT

A clip for securing lobster trapping equipment to a buoy. The clip has an elongate tubular body through which a rope attached to a lobster trap is threaded. The rope is then threaded through a buoy loop and clipped to the outer wall of the elongate tubular body by a pair of hooks. The clipped rope extends through a slot formed between the pair of hooks. The slot has oppositely facing sets of teeth which grab the rope and prevent its release under normal rope tensions, ie rope tensions caused by the motion of the sea. However, under certain extreme rope tensions, such as a whale entangled in the rope, the teeth are specifically designed to be unable to hold the rope under the extreme tension and will allow the rope to slip back through the teeth, slot and hooks to become disengaged with the outer wall of the clip and from the buoy.

1 Claim, 3 Drawing Sheets

U.S. PATENT DOCUMENTS

| | | | |
|---|---|---|---|
| 5,307,751 | 5/1994 | Shell | 24/130 |
| 5,519,921 | 5/1996 | Templer, Jr. | 24/130 |
| 5,519,961 | 5/1996 | Lauritzen et al. | 24/129 R |
| 5,660,133 | 8/1997 | Munich | 24/130 |
| 5,697,591 | 12/1997 | Cooper | 403/391 |
| 5,769,556 | 6/1998 | Colley | 403/391 |
| 5,846,017 | 12/1998 | Meyer | 403/397 |

ROPE SECUREMENT CLIP FOR FORMING A BREAK-AWAY CONNECTION

This application claims the benefit of provisional application No. 60/048,567 filed Jun. 4, 1997.

FIELD OF THE INVENTION

The present invention relates to a clip for securing the end of a rope and for releasing the rope should the tension on the rope exceed a pre-determined value, and more particularly, the present invention relates to a plastic clip for securing a rope carrying a lobster trap to a buoy and for breaking the connection should the tension on the rope exceed a predetermined tension value.

BACKGROUND OF THE INVENTION

The past and current practice in the lobster trapping industry has been to support lobster traps on the floor of the ocean via ropes connected to buoys floating on the surface of the ocean so that the lobster traps can be readily retrieved. The connection between the free end of the rope, remote from the lobster trap, to the buoy has been formed by knots or other known sturdy connection means so that the connection does not inadvertently become broken due to increased rope tension, for example, as created by rough seas. The advantage of forming a sturdy connection between the ropes and the buoys is that it prevents the loss of trapping equipment.

Recently, the environmental impact of the lobster trapping ropes which extend from the floor of the ocean to the surface of the ocean has come under question. For instance, it has been argued that large marine life, such as whales, can become entangled in the ropes and perish. Therefore, in the future, lobster trapping requirements may mandate that break-away connections be used between the ropes and the buoys so that should a whale become entangle in the rope, the increase in rope tension will cause the rope to be released from the buoy to aid in freeing the whale.

Although known means for securing the ends of ropes may be satisfactory for their intended purposes, there is a need for an improved clip capable of securing the end of a rope to a buoy and for breaking the connection should a predetermined rope tension threshold be experienced. The clip should provide a reliable connection up to the tension threshold to prevent unwanted loss of equipment due to, for instance, rough seas. In addition, the securement clip should be inexpensive to manufacture and easy to use.

OBJECTS OF THE INVENTION

With the foregoing in mind, a primary object of the present invention is to provide an improved rope securement clip which can reliably secure the end of a rope up to a predetermined threshold tension and which will reliably break the connection should the threshold be reached.

Another object of the present invention is to provide a rope securement clip capable of forming a break-away connection between a lobster trap rope and a buoy.

A further object of the present invention is to provide a rope securement clip which is inexpensive to manufacture and easy to use.

SUMMARY OF THE INVENTION

More specifically, the present invention provides a clip for use in securing a rope extending from a lobster trap to a buoy. The clip has an elongate tubular body with an outer wall and a bore which extends longitudinally through the elongate tubular body and which is capable of receiving a free end of the rope therethrough. A pair of spaced-apart hooks extend peripherally outward from the outer wall of the elongate tubular body for clipping a portion of the rope lengthwise along the outer wall of the elongate tubular body. In addition, a pair of substantially parallel walls project outwardly from the outer wall at a location between the spaced-apart hooks and define a lengthwise extending slot through which the rope clipped to the hooks can extend. A set of tapered engagement teeth extend from each of the parallel walls into the slot for engaging and securing the rope in the slot. Thus, when the free end of the rope is inserted through the bore; is extended through a buoy loop; is clipped to the hooks and extended through the slot; the rope is securely engaged by the tapered engagement teeth to form a connection between the lobster trap and the buoy.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENTS

Figure 1:
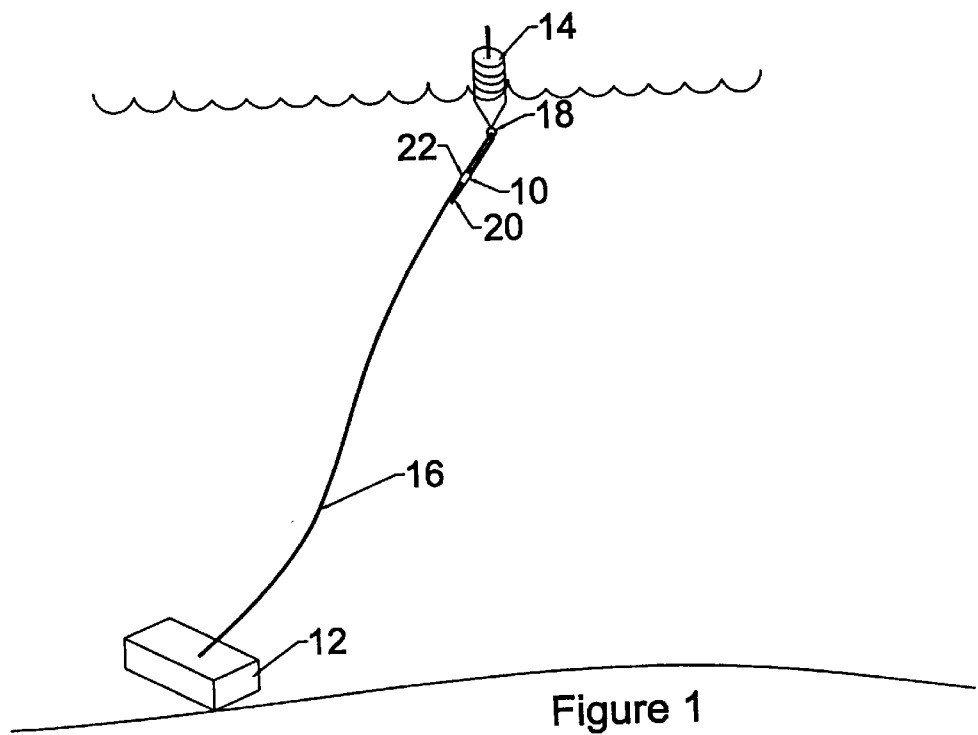
FIG. 1 is an elevational view of a trapping apparatus utilizing the present invention.

FIG. 1 illustrates typical lobster trapping equipment utilizing a clip 10 according to the present invention. A lobster trap 12 is connected to a marker buoy 14 via a rope 16. The lobster trap 12 is allowed to rest on the floor of the ocean, and when it is time to be retrieved, can be located by the buoy 14 and brought up by the rope 16. The rope 16 is securely affixed to the lobster trap 12 and is threaded through a loop 18 extending from the buoy 14. The clip 10 is utilized to secure the free end 20 of the rope 16 to an adjacent portion 22 of the rope 16 to provide a removable connection between the rope 16 and the buoy loop 18.

Figure 2:
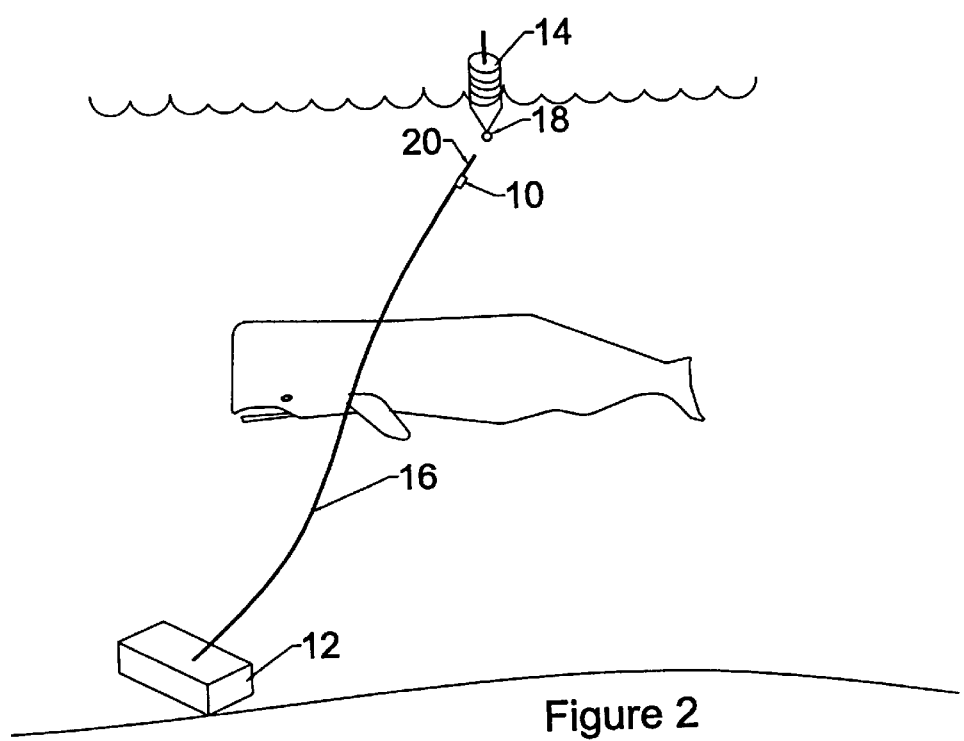
FIG. 2 is an elevational view of the trapping apparatus of FIG. I after a whale becomes entangled in the rope.
Figure 4:
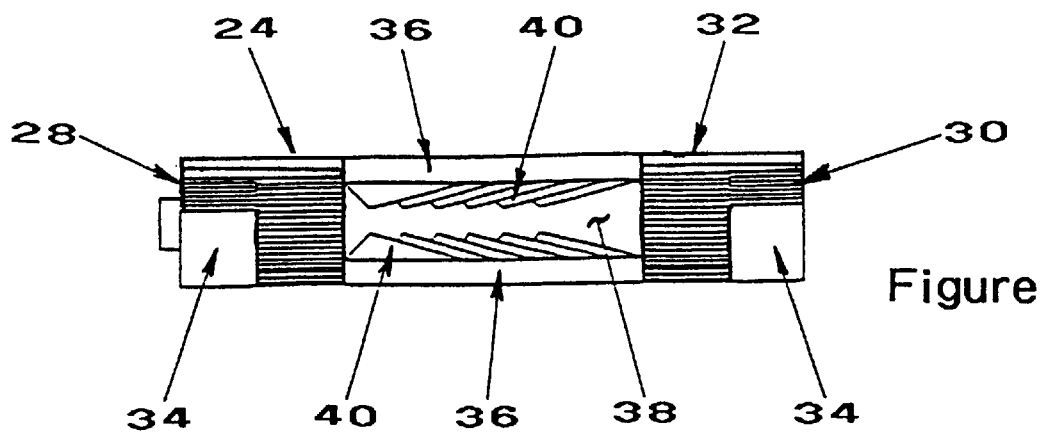
FIG. 4 is an elevational view of the clip illustrated in FIG. 3.
Figure 3:
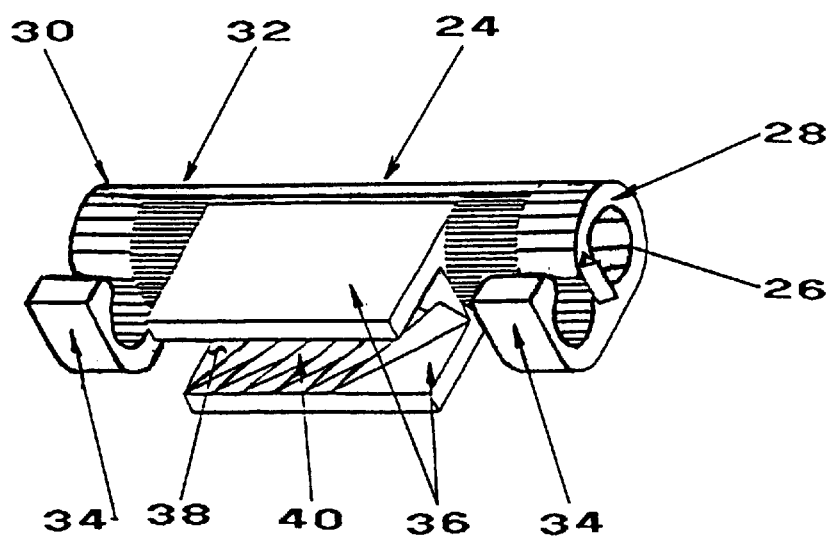
FIG. 3 is a perspective view of a clip embodying the present invention.
Figure 6:
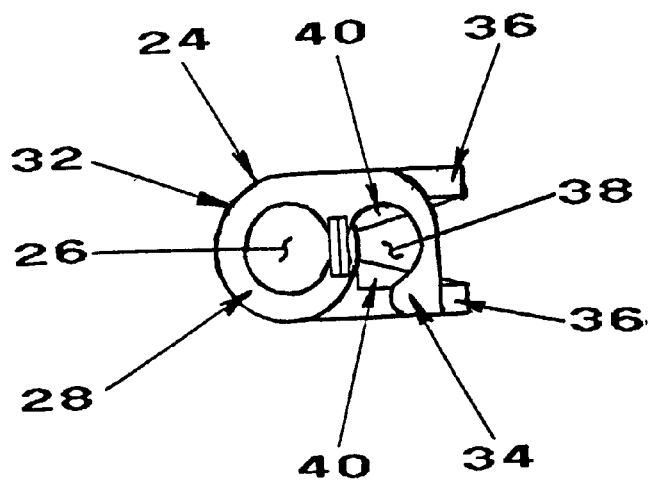
FIG. 6 is a side elevational view of the clip illustrated in FIG. 3.
Figure 5:
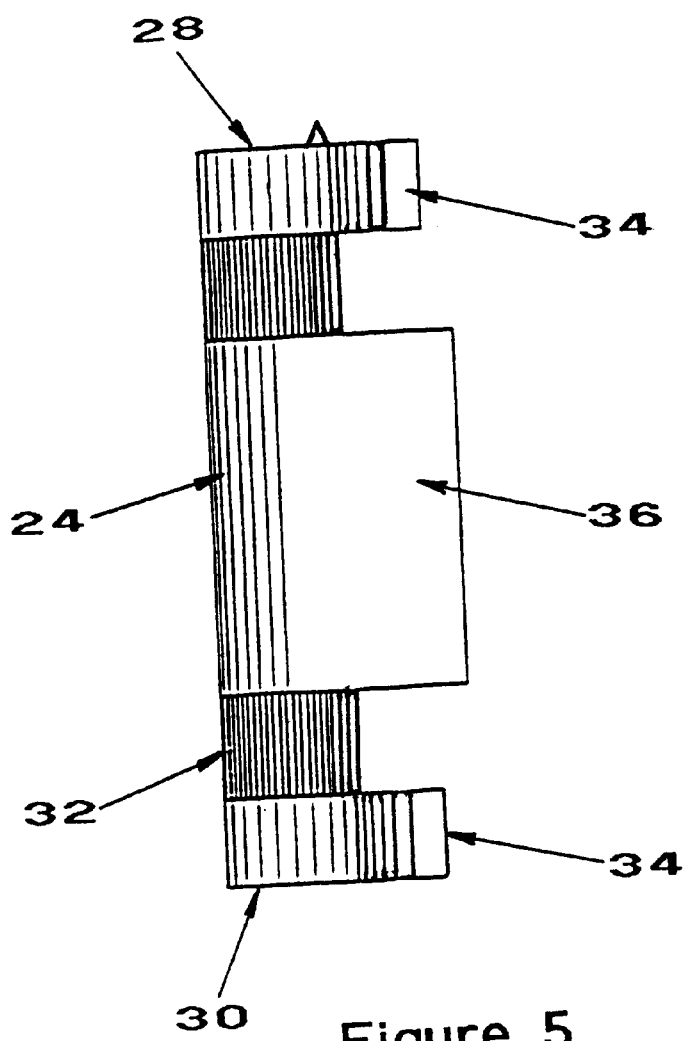
FIG. 5 is a plan view of the clip illustrated in FIG. 3.

As illustrated in FIG. 2, a whale may become entangled in the rope 16. In such an event, the clip 10 according to the present invention provides a break-away function to release the free end 20 of the rope and break the connection between the rope 16 and the buoy 14. This aids the whale in freeing itself from the rope 16.

Preferably, the clip 10 according to the present invention, as illustrated in FIGS. 3–6, has an elongate tubular body 24 with a bore 26 extending longitudinally from one end 28 of the body 24 closest to the lobster trap, to the other end 30 of the body 24 closest to the buoy. The body 24 has an outer wall 32 having a pair of hooks 34 and a pair of parallel walls 36 projecting outwardly therefrom. The hooks 34 extend peripherally from the outer wall 32, one adjacent each end, 28 and 30. The parallel walls 36 are located on the outer wall 32 between the hooks 34 and define a slot 38 therebetween. Each of the walls 36 are formed with a set of tapered engagement teeth 40 which extend into the slot 38.

The clip 10 as described above functions as follows. The free end 20 of the rope 16 is inserted into the end 28 of the elongate tubular body 24 and is threaded through the bore 26. The free end 20 of the rope 16 exits the body 24 at its end 30 and is then threaded through the loop 18 on the buoy 14. The free end 20 of the rope 16 is then clipped longitudinally along the outer wall 32 of the elongate tubular body 24 by the pair of hooks 34. The clipped rope between the hooks 34 extends through the slot 38 and is engaged by the teeth 40. The teeth 40 grab the rope 16 and prevent the rope 16 from being released under normal rope tension conditions. Thus, the lobster trap 12 is connected via the rope 16 to the buoy 14.

An important aspect of the present invention is that under certain rope tension conditions, namely that caused by an entangled whale, the clip 10 will break the connection between the rope 16 and the buoy 14. To this end, the size and type of the rope 16 and the size, shape, angle of taper and number of the teeth 40 determine the threshold tension at which the clip 10 will allow the rope 16 to be released. For example, the size, shape, angle of taper and number of the teeth 40 can be designed to securely grab a given size and type of rope up to a rope tension of about 50 pounds. For rope tensions above 50 pounds, the teeth 40 as designed will not be able to hold the rope 16 and will allow the free end 20 of the rope 16 to extend back through the teeth 40, the hooks 34 and the buoy loop 18 to break the connection between the rope 16 and the buoy 18. Alternatively, the size, shape, angle of taper, or number of teeth 40 could by selected to securely grab a given size and type of rope up to, for example, 1000 pounds of rope tension, or any predetermined threshold tension.

Preferably, the clip 10 as described and illustrated is manufactured of plastic utilizing injection molding techniques. Many alternative configurations can be utilized.

While a preferred securement clip has been described in detail, various modifications, alterations, and changes may be made without departing from the spirit and scope of the clip according to the present invention as defined in the appended claim.

We claim:

1. A clip for use in securing a rope extending from a lobster trap to a buoy, comprising:

an elongate tubular body having an outer wall and a bore extending longitudinally therethrough for receiving a free end of the rope therethrough;

a pair of spaced-apart hooks extending peripherally outwardly from said outer wall for clipping the rope lengthwise adjacent said outer wall; and a pair of substantially parallel walls projecting outwardly from said outer wall of said elongate tubular body defining a slot therebetween which extends lengthwise along said outer wall, said parallel walls being located between said hooks so that the rope clipped to said outer wall of said elongate tubular body extends through said slot;

each of said parallel walls having a set of tapered engagement teeth which extend into said slot for engaging and securing said rope in said slot up to a predetermined rope tension threshold;

whereby the free end of the rope inserted through said bore is extended through a buoy loop and is clipped to said hooks and engaged by said tapered engagement teeth in said slot along said outer wall of said elongate tubular body to connect the lobster trap to the buoy.

* * * * *

UNITED STATES PATENT AND TRADEMARK OFFICE
CERTIFICATE OF CORRECTION

PATENT NO. : 5,987,710
DATED : November 23, 1999
INVENTOR(S) : Daniel E. Paul & Nelson S. Jones It is certified that error appears in the above-identified patent and that said Letters Patent is hereby corrected as shown below:

On the title page item [76],

"Dan Paul" to --Daniel E. Paul-- and " Nelson Jones" to

--Nelson S. Jones--.

Signed and Sealed this

Twenty-third Day of May, 2000

Attest:

Q. TODD DICKINSON

*Attesting Officer*     *Director of Patents and Trademarks*